US009158836B2

(12) United States Patent
Chitiveli et al.

(10) Patent No.: US 9,158,836 B2
(45) Date of Patent: *Oct. 13, 2015

(54) ITERATIVE REFINEMENT OF SEARCH RESULTS BASED ON USER FEEDBACK

(75) Inventors: Srinivas V. Chitiveli, Germantown, MD (US); Joshua Fox, Emek Haela (IL); Josemina M. Magdalen, Jerusalem (IL); Michael Pelts, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 13/450,362

(22) Filed: Apr. 18, 2012

(65) Prior Publication Data

US 2012/0203770 A1 Aug. 9, 2012

Related U.S. Application Data

(63) Continuation of application No. 12/895,728, filed on Sep. 30, 2010.

(51) Int. Cl.
*G06F 7/00* (2006.01)
*G06F 17/30* (2006.01)

(52) U.S. Cl.
CPC ................................ *G06F 17/30648* (2013.01)

(58) Field of Classification Search
CPC ................ G06F 17/30867; G06F 17/30696; G06F 17/30616; G06F 17/30011; G06F 17/3053; G06F 17/30663; G06F 17/30648
See application file for complete search history.

(56) References Cited

U.S. PATENT DOCUMENTS

| | | | |
|---|---|---|---|
| 5,278,980 A | 1/1994 | Pedersen et al. | |
| 5,724,567 A | 3/1998 | Rose et al. | |
| 6,119,114 A | 9/2000 | Smadja | |
| 6,169,986 B1 | 1/2001 | Bowman et al. | |
| 6,327,593 B1 | 12/2001 | Goiffon | |
| 6,353,825 B1 | 3/2002 | Ponte | |
| 6,539,377 B1 | 3/2003 | Culliss | |
| 7,539,673 B2 | 5/2009 | Trowbridge | |
| 8,010,904 B2 * | 8/2011 | Prabhu | 715/765 |
| 8,077,931 B1 * | 12/2011 | Chatman et al. | 382/118 |
| 8,117,197 B1 * | 2/2012 | Cramer | 707/731 |
| 2002/0188949 A1 * | 12/2002 | Wang et al. | 725/46 |
| 2003/0225755 A1 * | 12/2003 | Iwayama et al. | 707/3 |
| 2004/0059996 A1 * | 3/2004 | Fasciano | 715/500.1 |
| 2005/0010553 A1 * | 1/2005 | Liu | 707/1 |
| 2005/0108200 A1 * | 5/2005 | Meik et al. | 707/3 |

(Continued)

OTHER PUBLICATIONS

U.S. Patent Application with U.S. Appl. No. 12/895,728, filed Sep. 30, 2010, entitled "Iterative Refinement of Search Results Based on User Feedback", invented by Chitiveli, S.V., J. Fox, J.M. Magdalen, and M. Pelts, Total 28 pp. [57.206 (Appln)].

(Continued)

*Primary Examiner* — Azam Cheema
(74) *Attorney, Agent, or Firm* — Janaki K. Davda; Konrad, Raynes, Davda & Victor LLP

(57) ABSTRACT

Provided are techniques for displaying search results in a first page, receiving feedback from the user that indicate which of the search results in the first page are at least one of relevant and irrelevant, re-ordering the search results in a second page based on the indications of the search results in the first page, and displaying the re-ordered search results in the second page.

6 Claims, 7 Drawing Sheets

(56) References Cited

U.S. PATENT DOCUMENTS

| | | | |
|---|---|---|---|
| 2006/0026152 A1* | 2/2006 | Zeng et al. ............... 707/5 |
| 2006/0224579 A1 | 10/2006 | Zheng | |
| 2006/0224587 A1 | 10/2006 | Zamir et al. | |
| 2006/0242553 A1 | 10/2006 | Kulas | |
| 2007/0233692 A1* | 10/2007 | Lisa et al. ............... 707/10 |
| 2008/0016034 A1 | 1/2008 | Guha et al. | |
| 2008/0147638 A1 | 6/2008 | Hoeber et al. | |
| 2008/0208819 A1 | 8/2008 | Wang et al. | |
| 2008/0235204 A1 | 9/2008 | Dai et al. | |
| 2009/0077071 A1 | 3/2009 | Mishkanian et al. | |
| 2009/0119254 A1 | 5/2009 | Cross et al. | |
| 2009/0119278 A1 | 5/2009 | Cross et al. | |
| 2009/0234814 A1 | 9/2009 | Boerries et al. | |
| 2009/0234834 A1 | 9/2009 | Cozzi | |
| 2011/0022590 A1* | 1/2011 | Yu ............... 707/728 |
| 2011/0144978 A1 | 6/2011 | Tinkler | |
| 2012/0084283 A1* | 4/2012 | Chitiveli et al. ............ 707/728 |

OTHER PUBLICATIONS

Zhu, W.D., S. Barron, M. Gallotti, V. Gupta, X. Wang, J. Magdalen, and J. Singer, "IBM Classification Module: Make it Work for You", Redbooks, IBM International Technical Support Organization, Oct. 2009, Total 214 pp.

Preliminary Amendment, Apr. 18, 2012, for U.S. Appl. No. 12/895,728, filed Sep. 30, 2010 by S.V. Chitiveli et al., Total 6 pp. [57.206 (PrelimAmend)].

Amendment 1, Oct. 26, 2012, for U.S. Appl. No. 12/895,728, filed Sep. 30, 2010 by S.V. Chitiveli et al., Total 14 pp. [57.206 (Amend1)].

Office Action 1, Jul. 31, 2012, for U.S. Appl. No. 12/895,728, filed Sep. 30, 2010 by S.V. Chitiveli et al., Total 34 pp. [57.206 (OA1)].

Amendment 2, May 10, 2013, for U.S. Appl. No. 12/895,728, filed Sep. 30, 2010 by S.V. Chitiveli et al., Total 13 pp. [57.206 (Amend2)].

Final Office Action 1, Feb. 14, 2013, for U.S. Appl. No. 12/895,728, filed Sep. 30, 2010 by S.V. Chitiveli et al., Total 28 pp. [57.206 (FOA1)].

Amendment 3, Mar. 5, 2014, for U.S. Appl. No. 12/895,728, filed Sep. 30, 2010 by S.V. Chitiveli et al., Total 13 pp. [Amend3 (57.206)].

Office Action 3, Dec. 5, 2013, for U.S. Appl No. 12/895,728, filed Sep. 30, 2010 by S.V. Chitiveli et al., Total 31 pp. [OA3 (57.206)].

Notice of Allowance, Feb. 27, 2015, for U.S. Appl. No. 12/895,728, filed Sep. 30, 2010 by S.V. Chitiveli et al., Total 12 pp. [57.206 (NOA)].

Final Office Action 2, Jun. 25, 2014, for U.S. Appl. No. 12/895,728, filed Sep. 30, 2010 by S.V. Chitiveli et al., Total 31 pp. [57.206 (FOA2)].

Response to Final Office Action 2, Sep. 24, 2014, for U.S. Appl. No. 12/895,728, filed Sep. 30, 2010 by S.V. Chitiveli et al., Total 13 pp. [57.206 (RFOA2)].

* cited by examiner

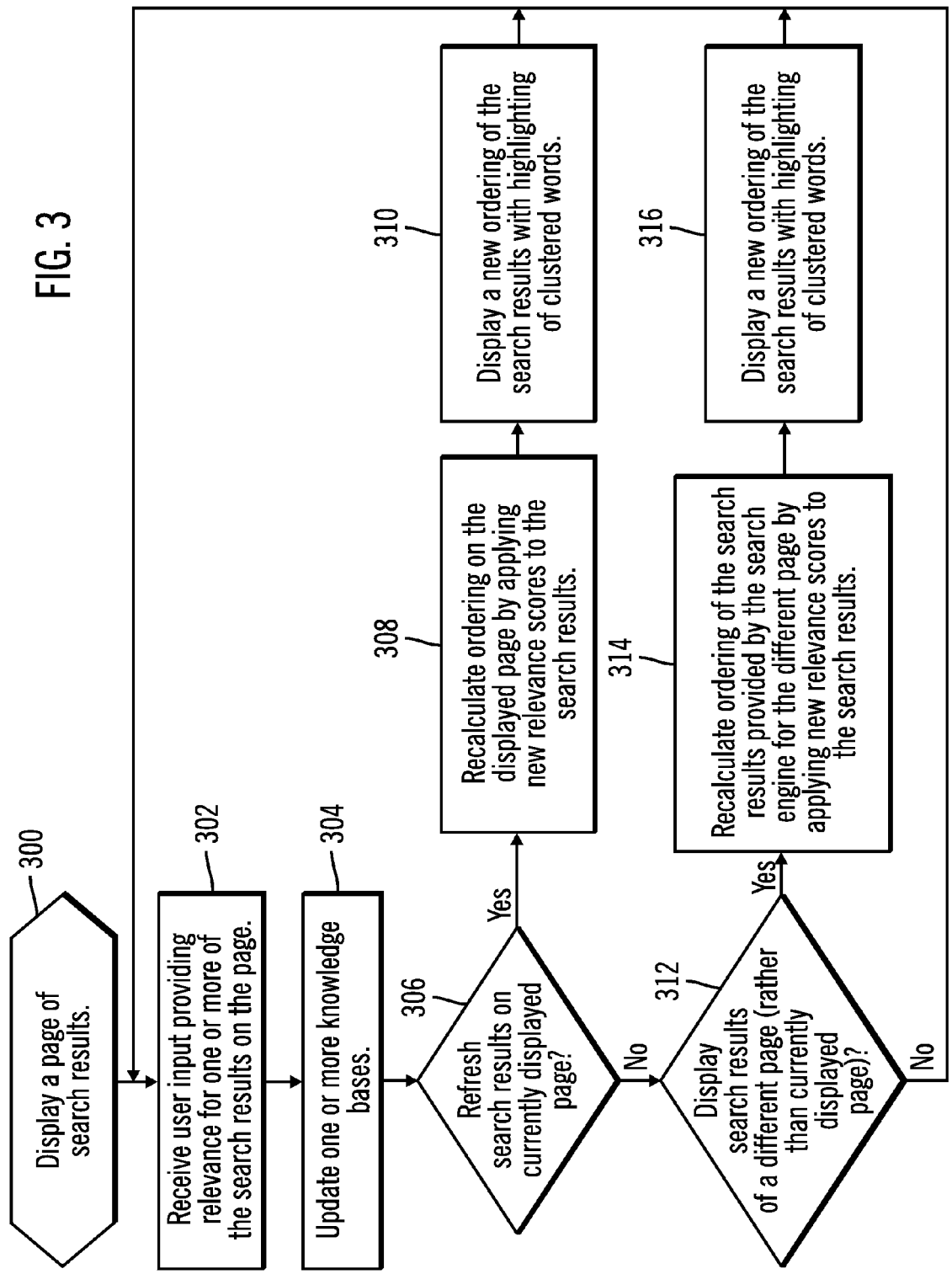

400

402 408

[programming styles] [Search] [⟳]

+ − Programming style - Wikipedia, the free encyclopedia
Encyclopedia article. Tutorial on general styling rules and conventions. Has a list of style guides for specific languages.

+ ▭ C++ Programming Style Guidelines
C++ Programming Style Guidelines, GeoSoft's 70+ style rules for C/C++ developers including naming conventions, code layout, commenting and more.

+ − Elements of Programming Style
Notes that provide standards for internal program documentation and style.

+ ▭ Tutorial on Good Lisp Programming Style
Good Lisp Programming Style. \Elegance is not optional." (Richard A. O'Keefe .....
Programming in the large is supported by a design style ...

+ − Code Conventions for the JAVA(R) Programming Language: Contents
Code Conventions for the JAVA(R) Programming Language ... 10 Programming Practices. 10.1 Providing Access to Instance and Class Variables. 10.2 Referring to ...

⎧ ▭ − A Programming Style for JAVA(R)
⎨     I've been programming full-time in JAVA(R) for several years, which hardly makes me an
⎩ 404 expert on the language, but I've developed a style I've become ...

+ ▭ ALU: Lisp Programming Style
Here are some general suggestions/notes about improving Lisp programming style, readability, correctness and efficiency. These are written by Mark ...

+ − Amazon.com: The Elements of Programming Style: Brian W. Kernighan ...
These 77 rules represent the definitive basis of good programming style and best ...
This was the definitive work on programming style when first written, ...

▭ − JavaRanch - JAVA(R) Programming Style Guide
A style guide provides a map so that the code generated by a group of programmers will be consistent and, therefore, easier to read and maintain ...

1 2 3 4 5 6 7 8 9 10    Next

```
┌─────────────────────────────────────────────────────────────┐
│                                                             │
│         ┌──────────────────────────────┐ ┌────────┐ ┌──┐    │
│         │ programming styles           │ │ Search │ │ C│    │
│         └──────────────────────────────┘ └────────┘ └──┘    │
│    ┌504                                                     │
│   ⎛  + −   A Programming Style for ⸺JAVA(R)⸺                │
│   ⎜  ═══   I've been programming full-time in ⸺JAVA(R)⸺ for several years, which hardly makes me an
│   ⎝        expert on the language, but I've developed a style I've become ...
│
│      + −   Code Conventions for the ⸺JAVA(R)⸺ Programming Language:  Contents
│      ═══   Code Conventions for the ⸺JAVA(R)⸺ Programming Language ... 10 Programming
│            Practices.  10.1 Providing Access to Instance and Class Variables. 10.2 Referring to ...
│
│      + −   ⸺JavaRanch⸺ - JAVA(R) Programming Style Guide
│      ═══   A style guide provides a map so that the code generated by a group of
│            programmers will be consistent and, therefore, easier to read and maintain ...
│
│      + −   Elements of Programming Style
│      ═══   Notes that provide ⸺standards⸺ for internal program documentation and style.
│
│      + −   Amazon.com: The Elements of Programming Style:  Brian W. Kernighan ...
│      ═══   These 77 rules represent the definitive basis of good programming style and ⸺best⸺.
│            This was the definitive work on programming style when first written, ...
│
│      + ⊟   ALU: Lisp Programming Style
│      ═══   Here are some general suggestions/notes about improving Lisp programming style,
│            readability, correctness and efficiency.  These are written by Mark ...
│
│      + ⊟   Tutorial on Good Lisp Programming Style
│      ═══   Good Lisp Programming Style.  \Elegance is not optional." (Richard A. O'Keefe .....
│            Programming in the large is supported by a design style ...
│
│      + ⊟   C++ Programming Style Guidelines
│      ═══   C++ Programming Style Guidelines, GeoSoft's 70+ style rules for C/C++ developers
│            including naming conventions, code layout, commenting and more.
│
│      + −   Programming style - Wikipedia, the free encyclopedia
│      ═══   Encyclopedia article.  Tutorial on general styling rules and conventions.  Has a list of style
│            guides for specific languages.
│
│                        1 2 3 4 5 6 7 8 9 10     Next
│                        ⎵⎵⎵⎵⎵⎵⎵⎵⎵⎵⎵⎵⎵⎵⎵⎵⎵
│                               510
└─────────────────────────────────────────────────────────────┘
```

FIG. 5

```
                            600
                            /
┌─────────────────────────────────────────────────────────────────────────┐
│                                                                         │
│                                                                         │
│                                                                         │
│                                                                         │
│           ┌─────────────────────────────────────┐ ┌────────┐ ┌───┐      │
│           │ programming styles                  │ │ Search │ │ ↻ │      │
│           └─────────────────────────────────────┘ └────────┘ └───┘      │
│                                                                         │
│     + −    Big JAVA(R) Style Guide                                      │
│     ≡      This coding style guide is a simplified version of one that has been used with ... If you │
│            already have programming experience, in JAVA(R) or another language, ... │
│                                                                         │
│     + −    C Coding Style Guide                                         │
│     ≡      File Format: PDF/Adobe Acrobat                               │
│            This style of naming was widely used in early Windows programming, but now is │
│            obsolete or at least should be considered deprecated ...     │
│                                                                         │
│     + −    Programming style                                            │
│     ≡      These documents deal with programming style issues, especially in C.  The ten │
│            commandments for C programers. \; It can't happen, explains how to write programs ... │
│            www.fermigier.com/fermigle/style.html.en - 4k - Cached - Similar pages - Notes this │
│                                                                         │
│     + −    The Elements of Programming Style - Wikipedia, the free encyclopedia │
│     ≡      The Elements of Programming Style, by Brian W. Kernighan and P.J. Plauger, is a │
│            seminal book in the study of programming style, advocating the notion that ... │
│                                                                         │
│     + −    Wildfire C++ Programming Style                               │
│     ≡      Tries to provide guidelines on how to use the various features found in the C++ language │
│                                                                         │
│     + −    MATLAB Programming Style Guidelines                          │
│     ≡      JAVA(R) Programming Style Guidelines, Geotechnical Software Services. Code Complete, │
│            Steve McConnel - Microsoft Press.  C++ Coding Standard, Todd Hoff ... │
│                                                                         │
│     + −    PHPBuilder.com, the best resource for PHP tutorials, templates ... │
│     ≡      Religion and Programming, Tom Anderson, 01/02/01 17:00 ... It is easy to get a good │
│            coding style, Lars Dybdahl, 01/02/01 04:24 ...               │
│                                                                         │
│     + −    GNU Coding Standards                                         │
│     ≡      Add a programming language for extensibility and write part of the program in that │
│            language ...... Use and old-style declaration, not a Standard C prototype. ... │
│                                                                         │
│                                                                         │
│                 Previous    1 2 3 4 5 6 7 8 9 10 11    Next             │
│                                                                         │
│                                                                         │
└─────────────────────────────────────────────────────────────────────────┘

FIG. 6
```

ITERATIVE REFINEMENT OF SEARCH RESULTS BASED ON USER FEEDBACK

CROSS-REFERENCE TO RELATED APPLICATIONS

This application is a continuation of and claims the benefit of U.S. patent application Ser. No. 12/895,728, filed Sep. 30, 2010, which application is incorporated herein by reference in its entirety.

BACKGROUND

1. Field

Embodiments of the invention relate to iterative refinement of search results based on user feedback.

2. Description of the Related Art

A user may issue a query (e.g., using one or more query terms) to a search engine. The search engine attempts to identify documents that the user may be interested in based on the query terms. Then, the search engine returns a list of documents to the user as search results, and the search results are displayed on one or more pages for the user.

Users' actions in reviewing search results can be used in understanding their preferences. For example, in some conventional systems, users, after reading search results, can express interest in certain results, by clicking through to them or by clicking a special User Interface (UI) feature for the purpose, and, at the same time, the users can ignore other search results. The user input can be used to improve the relevance of search results in refining the current query or subsequent queries.

Some conventional techniques automatically learn relevance from past search activities, and apply this learning to future search activities. For example, a conventional technique may use learning algorithms to scope a user's interests and use this as feedback into a result-ranking algorithm by assigning extra weight to results that are most likely to be relevant to the user. One limitation of this approach is in requiring the maintenance of a multi-session history for all queries, including persistence of queries in other semantic areas that may be completely irrelevant to the current search. A session may be described as a period associated with one user's log-in. For example, launching an instance of the browser and executing queries for a user is associated with one session (e.g., the launching and execution occur during the session). Once the browser is closed, the session is closed.

Other conventional techniques make use of implicit or explicit feedback in order to generate additional queries, in order to return more accurate results. These conventional techniques attempt to improve the search results relevance within a single search session. For example, some conventional techniques modify the original queries to include information extracted after applying information retrieval techniques to a set of relevant and irrelevant documents. However, automatically refined subsequent queries may be very noisy, especially when a small amount of feedback is available. In certain cases, the automatically refined subsequent queries may return results that are actually less relevant than those returned in the original query. For example, "noisy" may describe that the original query is amended by leveraging the locale of the browser or the language of the browser. This is good as long as the user understands the reason behind narrowing of the queries. However, if the user travels to a different geography, the user may not be able to find documents relevant to the new location as the query was amended for the prior locale.

BRIEF SUMMARY

Provided are a method, computer program product, and system for displaying search results in a first page, receiving feedback from the user that indicate which of the search results in the first page are at least one of relevant and irrelevant, re-ordering the search results in a second page based on the indications of the search results in the first page, and displaying the re-ordered search results in the second page.

BRIEF DESCRIPTION OF THE SEVERAL VIEWS OF THE DRAWINGS

Referring now to the drawings in which like reference numbers represent corresponding parts throughout:

FIG. 3 illustrates, in a flow diagram, logic performed by a Search Result Refinement (SRR) system in accordance with certain embodiments.

FIG. 4 illustrates a first page of search results in accordance with certain embodiments.

FIG. 5 illustrates an updated first page of search results in accordance with certain embodiments.

FIG. 6 illustrates a second page of search results in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments provide a way to capture user feedback on search results. The captured feedback is used to order (i.e., rank) the search results and display the ordered search results, with key words highlighted.

Embodiments provide an improved approach for leveraging the knowledge behind user's actions, while still conforming closely to the user's original intent. Embodiments improve the relevance of results within a single search session, without altering the original query.

Figure 1:
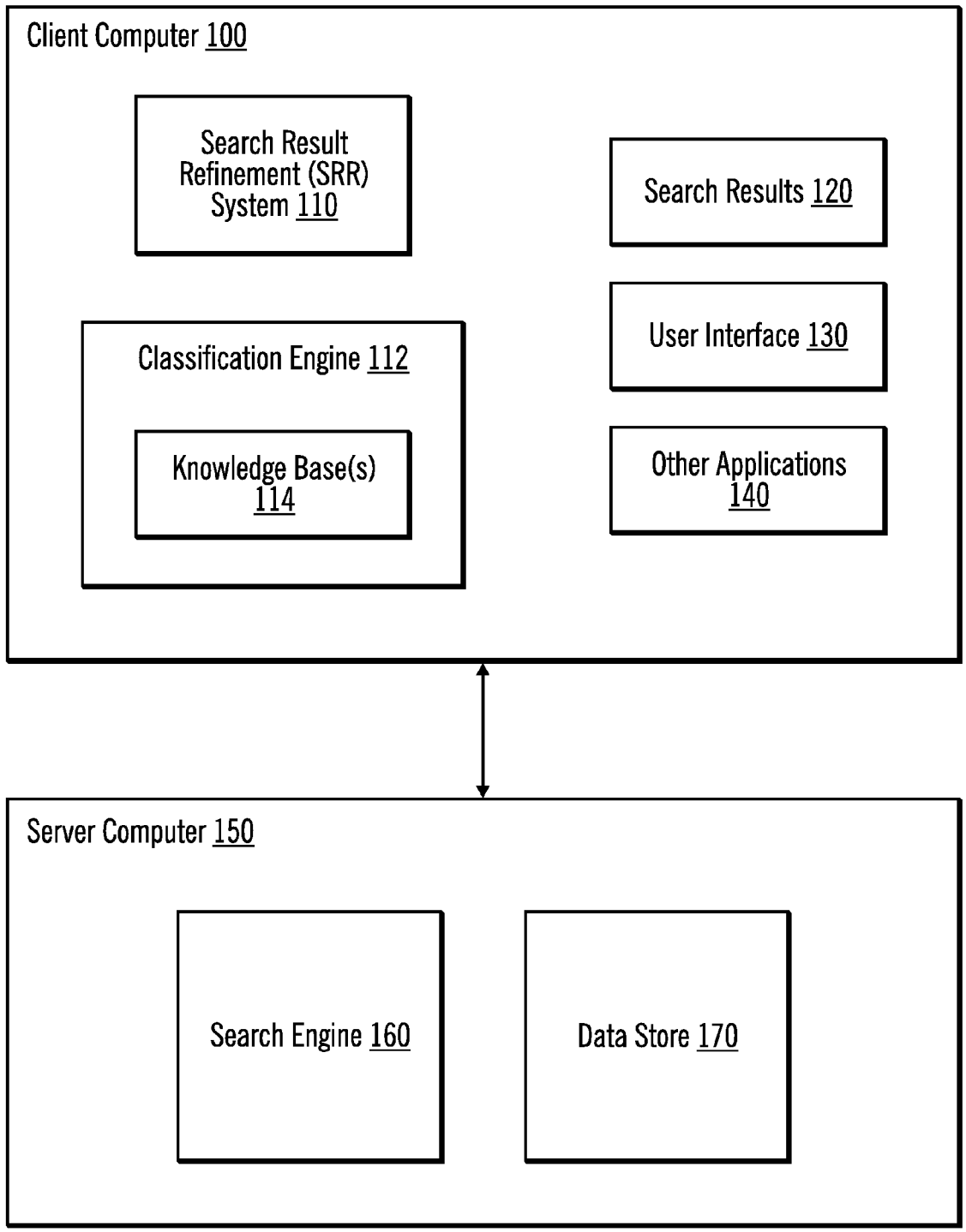
FIG. 1 illustrates, in a block diagram, a computing architecture in accordance with certain embodiments.

FIG. 1 illustrates, in a block diagram, a computing architecture in accordance with certain embodiments. A client computer 100 is coupled to a server computer 150. The client computer 100 includes a Search Result Refinement (SRR) system 110, a classification engine 112 search results 120 (e.g., for documents), and a user interface 130 (e.g., a browser application). The classification engine 112 contains one or more knowledge bases 114. Thus, the knowledge base 114 may be described as a component of the classification engine 112. The client computer 100 may also other applications 140. The server computer 150 includes a search engine 160 and a data store 170.

Figure 2:
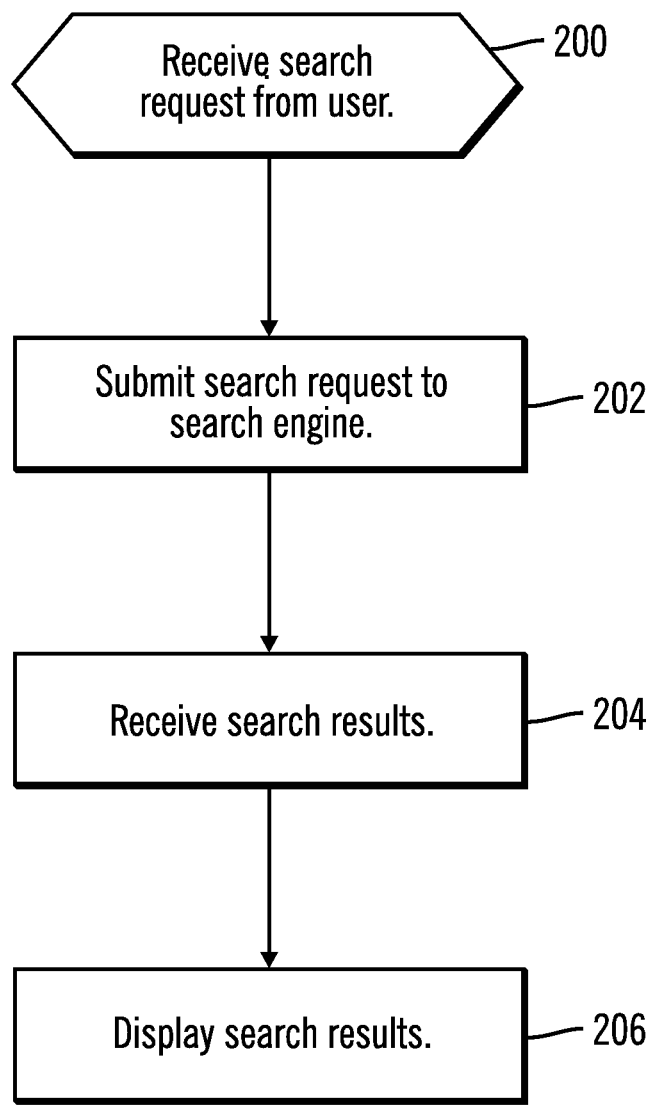
FIG. 2 illustrates, in a flow diagram, logic performed to obtain search results in accordance with certain embodiments.

FIG. 2 illustrates, in a flow diagram, logic performed to obtain the search results 120 in accordance with certain embodiments. Control begins at block 200 with receipt of a search request from a user via the user interface 130 at the client computer 100. The search request may be in any form (e.g., natural language or other form) and provides one or more query terms (e.g., tokens or words). In block 202, the user interface 130 submits the search request to the search engine 160 at the server computer 150. The search engine 160 processes the search request to retrieve search results from, for example, the data store 170. The search engine 160 ranks the search results and returns the search results to the user interface 130. In block 204, the user interface receives the search results 120. In block 206, the user interface 130 displays the search results 120, one page at a time, to the user at the client computer 100. Typically, a first page of the search results 120 is displayed. The user provides input to select another page (e.g., the next page or a particular page in the search results), and the user interface 130 displays the selected page of the search results.

A user frequently reviews several pages of the search results 120 until finding what the user is looking for (e.g., a desired document). The SRR system 110 leverages the implicit or explicit feedback that the user provides while reviewing previous pages of search results for an original query to promote (i.e., move up on the list) the most relevant results on following (subsequent) pages of search results and for subsequent queries. The more pages that the user goes through, the better the accuracy in ordering the search results on a page.

FIG. 3 illustrates, in a flow diagram, logic performed by a Search Result Refinement (SRR) system in accordance with certain embodiments. Control begins at block 300 with the user interface 130 displaying a page of the search results 120. In block 302, the SRR system 110 receives user input providing relevance for one or more of the search results 120 on the page. The user input may be from the user clicking through the search result or with the user using the new user interface component.

For example, FIG. 4 illustrates a first page of search results in accordance with certain embodiments. In FIG. 4, the search results are displayed ranked by the search engine 160 at the server computer 150 for the query terms 402 "programming styles". The returned search results have the query terms 402 "programming styles" in bold in each of the search results.

In FIG. 4, next to each search result is a new user interface component including a plus button ("+"), a minus button ("−"), and a bar. The plus and minus buttons are used by a user to express relevancy of that particular search result. The bar visually represents the relevance score of the search result. A user selects the plus button to increase relevance of a search result and selects the plus button to decrease the relevance of the search result. Selecting (e.g., clicking on) the plus causes the bar to fill in with color. The more the bar is filled, the more relevant the corresponding search result is to the user. Selecting (e.g., clicking on) the minus causes the fill in the bar to decrease in color. The less the bar is filled, the less relevant the corresponding search result is to the user. Also, it may be said that the less the bar is filled in, the more irrelevant the document is to the user. For each search result, when the user reviews the list of search results, the user can mark zero or more of the search results as relevant or irrelevant. In certain embodiments, each point on the bar is associated with a relevance score. In certain embodiments, pointing at the bar results in the relevance score being displayed.

Using the plus and minus buttons for some of the search results, the user has provided feedback on search results on the displayed page. In particular, the user has selected plus buttons on the search results related to "JAVA®" skills and programming standards. For example, for the search result 404 ("A Programming Style for JAVA®"), and the user has used the plus button to almost completely fill in the bar, signifying that this document is relevant to the user. (JAVA is a registered trademark or common law mark of Sun Microsystems in the United States and/or other countries.) On the other hand, for search result 406 ("ALU: Lisp Programming Style"), the bar is empty, signifying that this document is not relevant to the user.

Thus, with every feedback, the relevant bar next to each search result is updated, and the relevance score for each updated search result is recalculated. The new user interface bar helps the user to identify the most relevant results at a glance. Returning to FIG. 3, in block 304, the classification engine 112 updates (e.g., creates and/or modifies) one or more knowledge bases 114. In certain embodiments, each knowledge base 114 may be described as an artificial intelligence tool that provides computerized collection, organization, and retrieval of knowledge. Each knowledge base 114 has one or more categories. In certain embodiments, the knowledge base 114 has two categories: 1) relevant and 2) irrelevant.

The classification engine 112 captures the documents represented by the search results 120 and clusters at least some of the words in the documents. Clustering may be described as tokenizing the document to obtain tokens (e.g., for "hello, friend", the tokens are "hello" and "friend"), removing stop words, stemming the words to obtain stems (where a stem is a part of the word that is common to variants (e.g., friend may be the stem of friends and friendship), and identifying the top (e.g., most frequently used) list of words used in the document. In certain embodiments, this top list represents the content of the document. The classification engine 112 updates (e.g., creates and/or modifies) one or more dynamic knowledge bases 114 by adding the clustered words (i.e., the top list of words) to the categories (e.g., relevant and irrelevant categories) in the one or more knowledge bases 114. Thus, the classification engine 112 updates the one or more knowledge bases 114 by clustering words in the search results into a relevant category or an irrelevant category. In block 306 of FIG. 3, the SRR system 110 determines whether the user has requested that the search results on the currently displayed page be refreshed. If so, processing continues to block 308, otherwise, processing continues to block 310. In certain embodiments, the user selects a refresh button 408 to indicate that the search results on the displayed page are to be refreshed.

In block 308, the SRR system 110 recalculates the ordering on the displayed page by applying new relevance scores to the search results. That is, the SRR system 110 re-sorts the search results by applying the custom relevancy feedback. In block 310, the SRR system 110 displays a new ordering of the search results with highlighting of clustered words (e.g., the top words). The highlighted words may include the query terms and/or non-query terms (i.e., terms in the displayed search results that were not used in the original query). From block 310, processing loops back to block 302. In certain embodiments, the clustered words that are highlighted are the top list of words in one or more documents for the search results with the highest relevancy scores.

It is possible for a user to view the refreshed page, further adjust relevance scores, and then request another refresh of the displayed page of search results. This may result in a different ordering of search results and/or different words being highlighted. Thus, the search results are iteratively refined based on user feedback.

Highlighting may be described as a user interface tool that identifies some words as standing out from others (e.g., by covering them with a color, such as yellow). For ease of illustration, highlighted words are shown in dashed boxes in FIGS. 5 and 6.

The SRR system 110 highlights the newly identified words clustered by the classification engine 112 from the documents marked in the feedback, which reflects the improved analysis of relevance. These newly identified words help the users to correlate the relevance scores with concepts of interest.

The SRR system 110 identifies the clustered words built in the one or more knowledge bases 114.

FIG. 5 illustrates an updated first page of search results (e.g., after a user has selected a refresh button) in accordance with certain embodiments. In FIG. 5, search result 504 ("A Programming Style for JAVA®") is listed at the top of the search results (whereas, in FIG. 4, this was listed lower on the page). In FIG. 5, the clustered words that are highlighted include "JAVA®", "standards", and "best", which concur with the user's context of interests.

The SRR system 110 does not change the original query. Instead, the SRR system 110 applies feedback into the original ranking by reordering the search results or by highlighting the search results according to relevance. This ensures that the user sees results which conform to the user's original intent. The SRR system 110 provides automatic refinements to improve the ordering or the highlighting. This gives users a sense of control over the ultimate choice of a discovered item.

In block 312, the SRR system 110 determines whether the user has requested that the search results of a different page (rather than the currently displayed page) be displayed. The different page may be a previously displayed page, a subsequent (e.g., next) page, or a specific page (e.g., a page identified from the page identifiers 510). If so, processing continues to block 314, otherwise, processing loops back to block 302.

In block 314, the SRR system 110 recalculates the ordering of the search results provided by the search engine 160 for the different page displayed page by applying new relevance scores to the search results. In this case, the relevance scores may be from user feedback on one or more other pages of search results. In block 316, the SRR system 110 displays a new ordering of the search results with highlighting of clustered words (e.g., the top words). From block 316, processing loops back to block 302.

That is, when the user navigates to another page of search results, the relevancy associations in one or more dynamic knowledge bases 114 are applied automatically.

FIG. 6 illustrates a second page of search results in accordance with certain embodiments. In FIG. 6, the search results are sorted and clustered words are high lighted to preserve user relevance scores created on the first page (FIG. 5).

The user can continue to provide feedback on any displayed page to further refine the search results 120.

The classification engine 112 is based on a supervised/adaptive learning mechanism that is used for calculating the relevance score. The supervised/adaptive learning mechanism allows the SRR system 110 to seamlessly improve the accuracy by accepting feedback from every user action. The classification engine 112 builds a statistical profile of categories based on sample texts that represent the kinds of text that are expected to be received in documents. The statistical information can consist of entities, such as words in the text, the number of occurrences of those words, hints about the text, and the distance between words. Categories are the basic elements within the knowledge base. The categories may represent the textual content of a text, or they can indicate another attribute, such as the source of the text. A category has a set of features that characterizes a category and distinguishes the category from other categories.

The classification engine 112 compares a new content item to the profiles of the categories (e.g., relevant and irrelevant categories). The new content item is classified into a category of one or more knowledge bases 114 and may be highlighted in the search results (e.g., if the new content item has one or more of the features or attributes of the category, then, the content item is classified into that category). For example, if the new content item is identified as relevant by the user, then, the new content item is classified with the relevant category in the knowledge base. As another example, if the new content item is identified as irrelevant by the user, then, the new content item is classified with the irrelevant category in the knowledge base.

In certain embodiments, for each session, the classification engine 112 builds the statistical knowledge base 114 with the categories of relevant and irrelevant. The knowledge base 114 consists of profiles per category storing the representative information, and this assists in finding similar documents.

When the user specifies the relevance of a search result to the current search (e.g., by clicking through the search result or with the new user interface component), the classification engine 112 adjusts the knowledge base 114. Then, the SRR system 110 refines the search results accordingly. For example, the SRR system 110 filters results that are identified as irrelevant with high confidence.

In certain embodiments, the SRR system 110 recalculates relevance scores for search results on a particular page. In certain alternative embodiments, the SRR system 110 recalculates relevance scores for search results on multiple or all pages or on a fixed number of search results (e.g., 100 search results, regardless of how many pages these would be displayed on).

In certain embodiments, the knowledge base 114 is created for each session. In certain alternative embodiments, the knowledge base 114 is stored across sessions so that further searches on the same query or very similar queries can take advantage of the personalized search relevance ranking. Moreover, although embodiments do not require any persistence across sessions, the knowledge base 114 for each user may be optionally be saved to provide quick refinement in subsequent searches. In such cases, the future search sessions also accept user feedback for improving those and future search results.

The SRS system 110 acts on the top of the search results returned by the back end server computer 150. Thus, the SRS system 110 may be implemented entirely at the client computer 100. This approach provides the benefits when compared to server side solutions. For example, no personal information is stored on the server computer 150, which is important in protecting privacy. It is much more scalable, since the information per user is stored on a client computer 100, and the relevance recalculations are performed on the client computer 100 of each user. Moreover, the client-side approach avoids network lag.

Embodiments allow refinement of search results for an original query to occur immediately and without storing session information, which some users prefer to avoid. Embodiments also allow the data to remain client-side-only for efficiency and privacy. Embodiments reflect the user's own personal information.

Embodiments provide improved relevance ranking of search results. Embodiments preserve the user's original query, which helps ensure that the user's original intent and context of the search is maintained. Embodiments preserve the original search result and reorder these search results according to the selective behavior of the user as the user examines the search results. With embodiments, this is done on a page by page basis so as not to completely remove or introduce new search results. Moreover, embodiments provide supervised training for classification in a dynamic way responding to user feedback.

The success of a search engine is related to the precision and recall of the search results that the search engine provides. Embodiments improve relevancy of search results without affecting the server based component of the search engine. In particular, a user query, is received at the client computer 100. The client computer 100 receives multiple pages of search results 120 from the search engine 160 at the server computer 150. The client computer stores the multiple pages of search results 120 locally. Then, the client computer 100 is able to re-order the search results 120 on one or more of the multiple pages without contacting the server computer.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Figure 7:
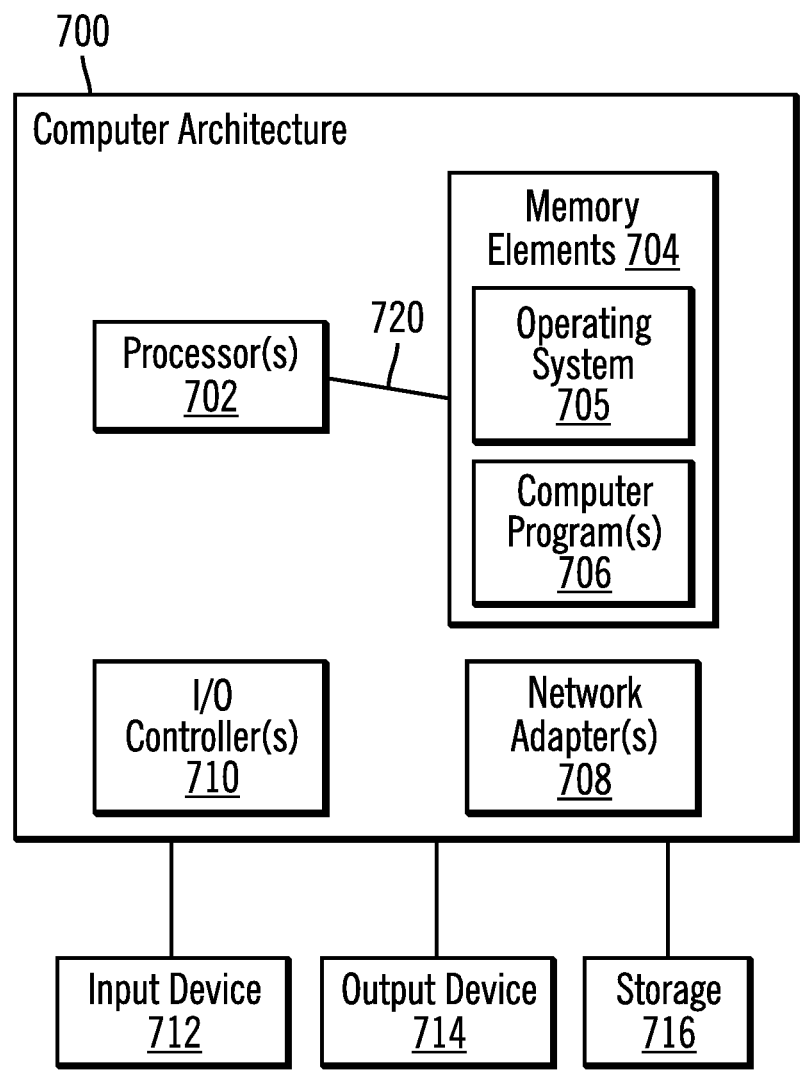
FIG. 7 illustrates a computer architecture that may be used in accordance with certain embodiments.

FIG. 7 illustrates a computer architecture 700 that may be used in accordance with certain embodiments. Client computer 100 and/or server computer 150 may implement computer architecture 700. The computer architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The computer architecture 700 may be coupled to storage 716 (e.g., a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The computer architecture 700 may include fewer components than illustrated, additional components not illustrated herein, or some combination of the components illustrated and additional components. The computer architecture 700 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
   receiving, using a computer including a processor, search results for a first page and a second page in response to a query;
   displaying search results in the first page along with a bar associated with each of the search results, wherein, for each of the search results, the bar visually represents a relevance score and has a plus button and a minus button, wherein selection of the plus button causes the bar to fill in with color to visually represent a higher relevance to a user, and wherein selection of the minus button causes the bar to decrease in color to visually represent a lower relevance to the user;
   receiving feedback from the user for at least one of the search results in the first page by receiving selection of at least one of the plus button for increasing the relevance score and the minus button for decreasing the relevance score;
   re-ordering search results in the first page by applying new relevance scores to each of the search results in the first page based on the feedback of the search results in the first page;
   identifying most frequently used words in the search results;
   adding the most frequently used words in the search results into categories;
   highlighting the most frequently used words in the search results; and
   re-ordering search results in the second page by applying new relevance scores to each of the search results in the second page based on the feedback of the search results in the first page.

2. The method of claim 1, further comprising:
   updating a knowledge base by adding the most frequently used words in the search results into one of a relevant category and an irrelevant category.

3. The method of claim 1, further comprising:
   highlighting the most frequently used words in displayed search results in the second page.

4. The method of claim 1, further comprising:
   receiving selection of a refresh button from the user; and re-ordering displayed search results in a currently displayed page.

5. The method of claim 1, further comprising:
under control of a client computer, in response to receiving a user query,
   receiving multiple pages of search results from a search engine at a server computer;
   storing the multiple pages of search results; and
   re-ordering the search results in one or more of the multiple pages without contacting the server computer.

6. The method of claim 1, further comprising:
displaying the re-ordered search results in the second page.

* * * * *